United States Patent
Ohki

(10) Patent No.: US 7,237,780 B2
(45) Date of Patent: Jul. 3, 2007

(54) APPARATUS FOR ADJUSTING VEHICLE HEIGHT

(75) Inventor: Toshiyuki Ohki, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 408 days.

(21) Appl. No.: 10/849,201

(22) Filed: May 20, 2004

(65) Prior Publication Data

US 2004/0232648 A1 Nov. 25, 2004

(51) Int. Cl.
*B60G 17/00* (2006.01)
(52) U.S. Cl. .............................. 280/6.157; 280/124.165
(58) Field of Classification Search ............ 280/5.514, 280/6.15, 6.153, 6.157, 124.164, 124.165; 267/64.16, 64.17, 218, 221, 224, 225
See application file for complete search history.

(56) References Cited

U.S. PATENT DOCUMENTS

| | | | | |
|---|---|---|---|---|
| 1,363,541 A | * | 12/1920 | Thompson | 267/225 |
| 2,712,946 A | * | 7/1955 | Cicero | 280/6.159 |
| 3,414,278 A | * | 12/1968 | Schmid | 280/5.514 |
| 3,598,422 A | * | 8/1971 | Strauff | 280/124.162 |
| 3,603,610 A | * | 9/1971 | Thompson | 267/221 |
| 5,263,695 A | * | 11/1993 | Bianchi | 267/225 |
| 6,070,863 A | * | 6/2000 | Pradel | 267/221 |
| 6,830,256 B2 | * | 12/2004 | Bryant | 284/124.106 |
| 2002/0038929 A1 | | 4/2002 | Now | |
| 2004/0232648 A1 | * | 11/2004 | Ohki | 280/124.164 |

FOREIGN PATENT DOCUMENTS

| | | |
|---|---|---|
| DE | 199 55 410 A1 | 5/2001 |
| DE | 101 26 072 C1 | 11/2002 |
| DE | 101 44 111 A1 | 3/2003 |
| JP | 7-253135 A | 10/1995 |

* cited by examiner

*Primary Examiner*—Eric Culbreth
*Assistant Examiner*—Barry Gooden, Jr.
(74) *Attorney, Agent, or Firm*—Foley & Lardner LLP

(57) ABSTRACT

An apparatus for adjusting vehicle height, the apparatus being disposed between a vehicle body and a wheel assembly, the apparatus including a first suspension coil spring adapted to be connected to the vehicle body, a second suspension coil spring adapted to be connected to the wheel assembly, the second suspension coil spring being different in diameter from the first suspension coil spring and arranged in serial relation to the first suspension coil spring in an axial direction thereof, and an actuator substantially disposed within an inside space defined by the first and second suspension coil springs. The actuator is operative to axially move one of the first and second suspension coil springs relative to the other thereof.

8 Claims, 4 Drawing Sheets

APPARATUS FOR ADJUSTING VEHICLE HEIGHT

BACKGROUND OF THE INVENTION

The present invention relates to an apparatus for adjusting height of a vehicle body, which is useable in a vehicle suspension.

Japanese Patent Application First Publication No. 7-253135 shows a hydropneumatic cylinder acting as a shock absorber in a vehicle suspension. The hydropneumatic cylinder includes a sleeve and a stepping motor axially driving the sleeve. The stepping motor is arranged upward of a suspension unit.

SUMMARY OF THE INVENTION

Such a hydropneumatic cylinder of the related art is disadvantageous in view of space-saving due to the arrangement of the stepping motor above the suspension unit. Further, the hydropneumatic cylinder causes high pressure inside the shock absorber, which results in increase in friction produced during the stroke of the sleeve. This deteriorates comfort of the vehicle occupants.

It is an object of the present invention to provide an apparatus for adjusting height of a vehicle body, which is capable of space-saving and enhancing comfort of the vehicle occupants.

In one aspect of the present invention, there is provided an apparatus for adjusting vehicle height, the apparatus being disposed between a vehicle body and a wheel assembly, the apparatus comprising:
a first suspension coil spring adapted to be connected to the vehicle body;
a second suspension coil spring adapted to be connected to the wheel assembly, the second suspension coil spring being different in diameter from the first suspension coil spring and arranged in serial relation to the first suspension coil spring in an axial direction thereof; and
an actuator substantially disposed within an inside space defined by the first and second suspension coil springs, the actuator being operative to axially move one of the first and second suspension coil springs relative to the other thereof.

DETAILED DESCRIPTION OF THE INVENTION

Figure 1:
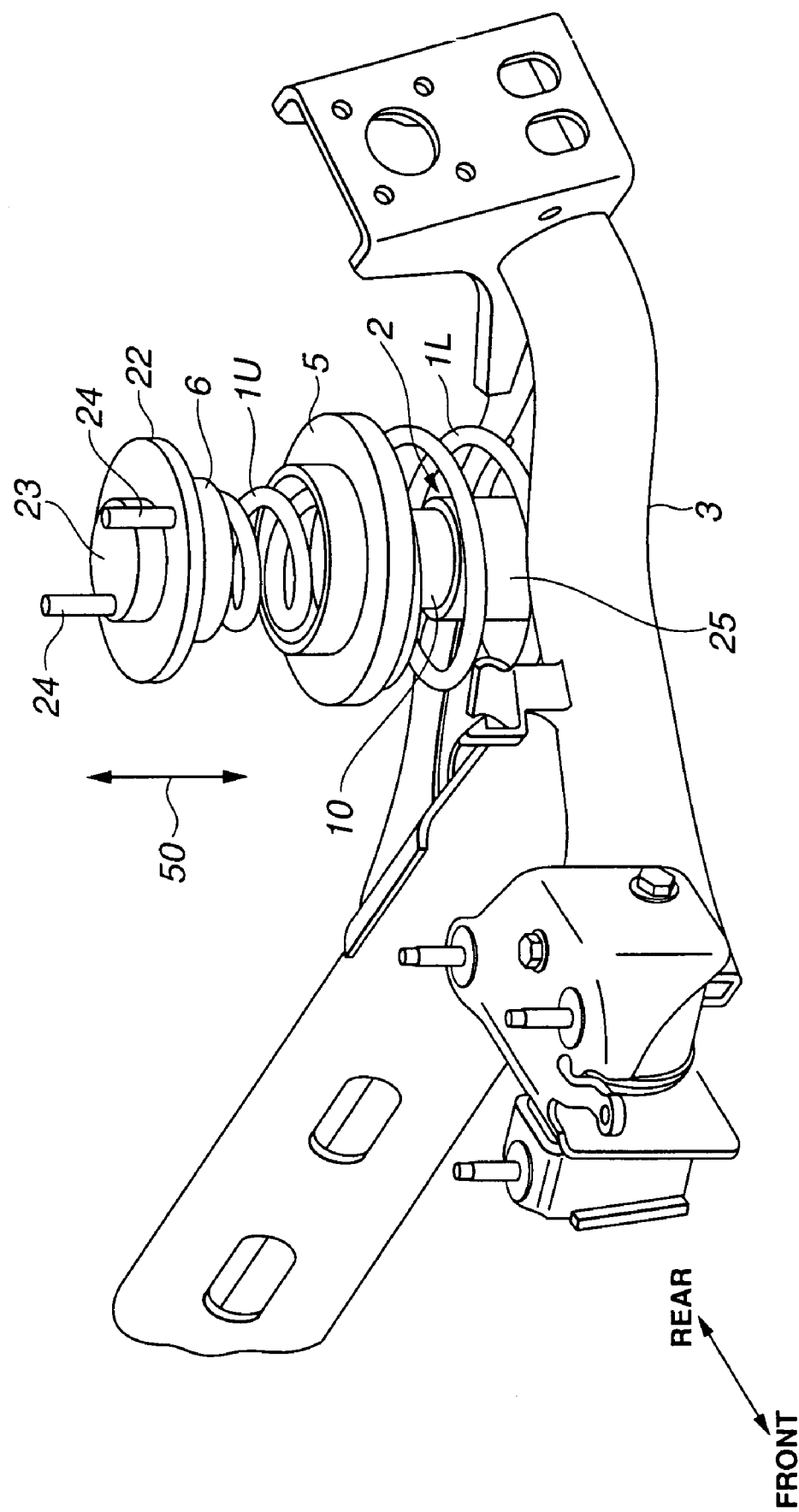
FIG. 1 is a perspective view showing a vehicle height adjusting apparatus according to a first embodiment of the present invention.
Figure 2:
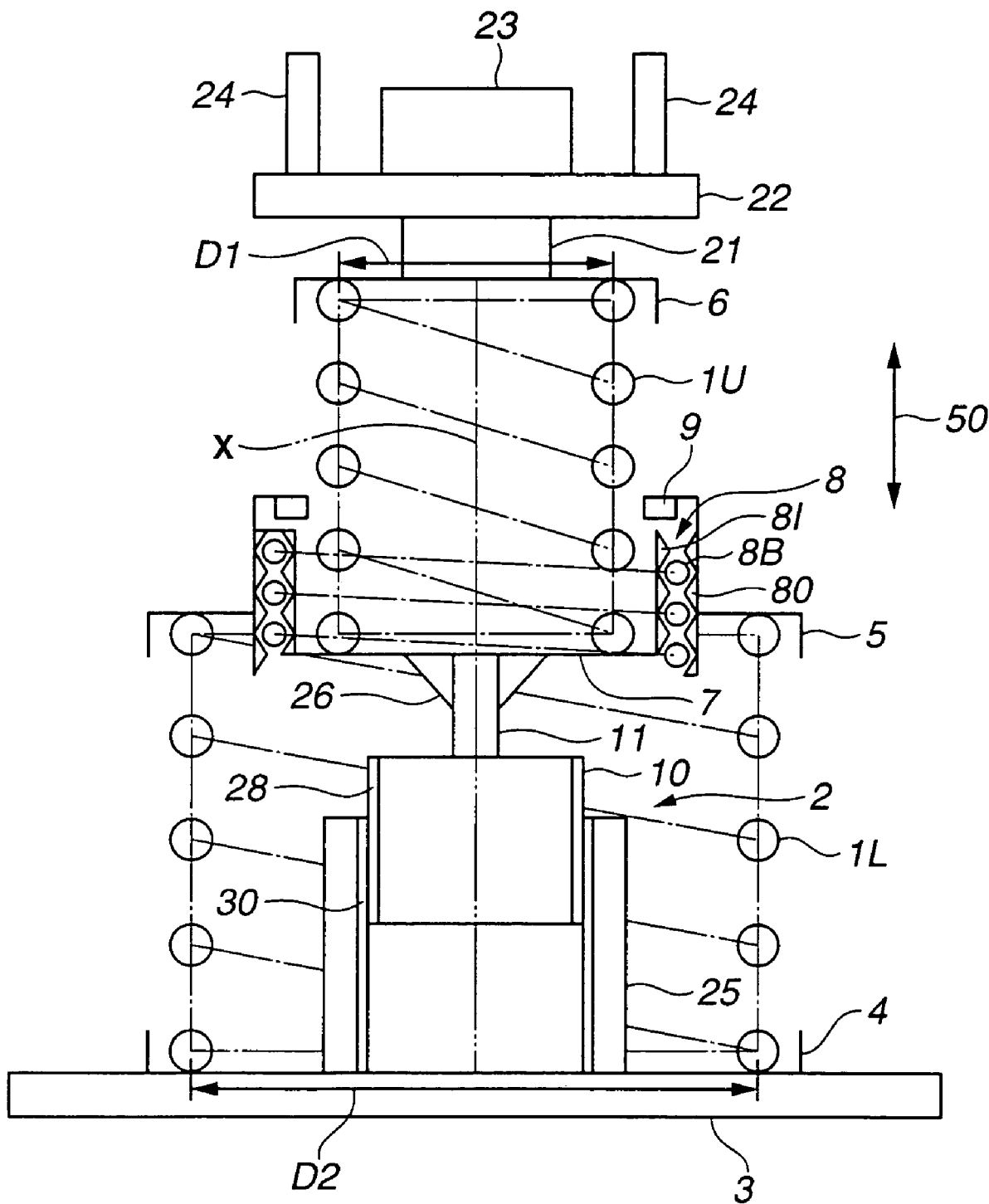
FIG. 2 is a schematic diagram illustrating a construction of the vehicle height adjusting apparatus of FIG. 1.
Figure 3:
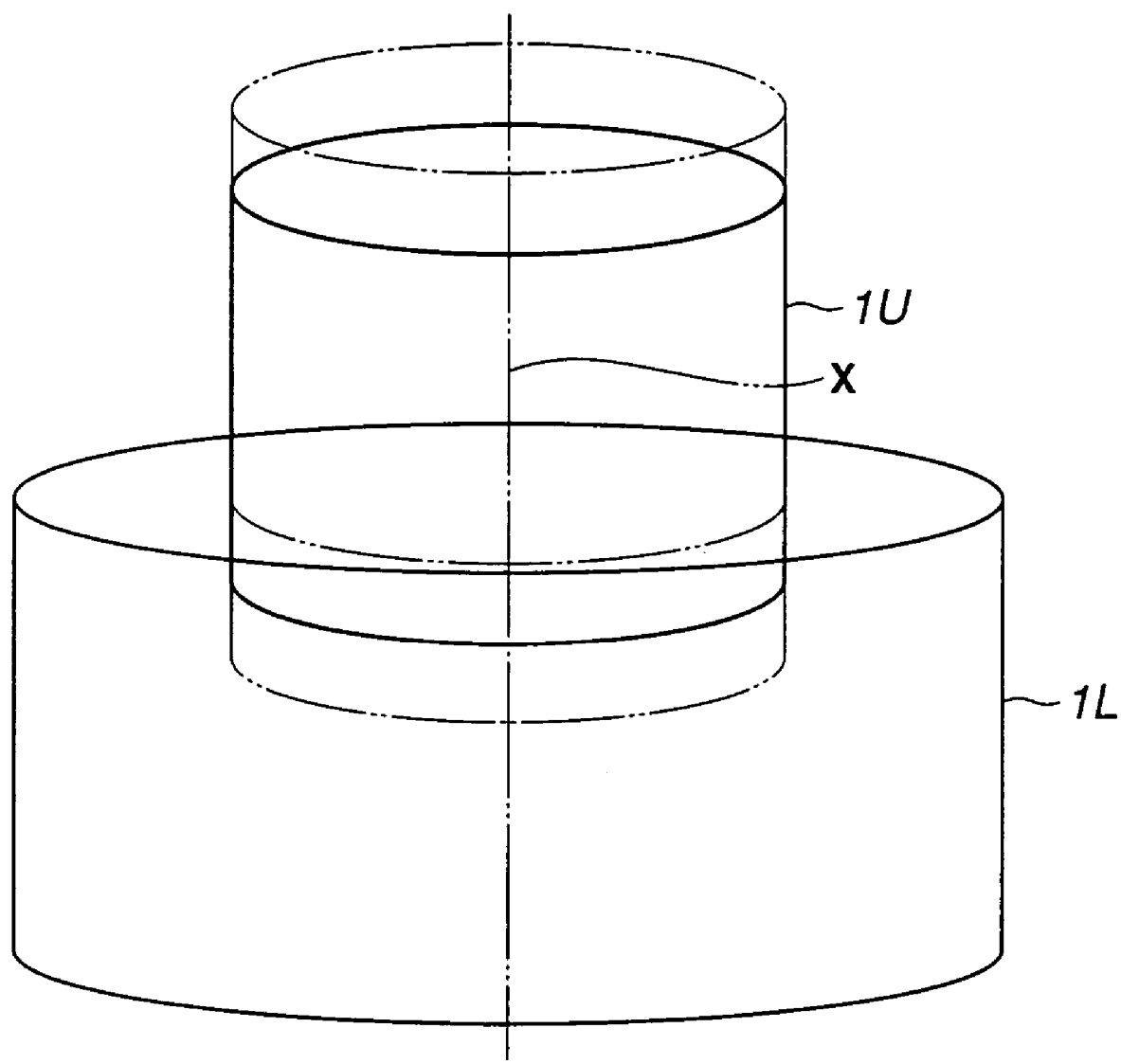
FIG. 3 is a schematic explanatory diagram illustrating an operation of suspension coil springs used in the vehicle height adjusting apparatus of FIG. 1.

Referring to FIGS. 1–3, an apparatus for adjusting vehicle height, according to a first embodiment of the present invention, which is useable in a vehicle suspension, now is explained. In this embodiment, the vehicle height adjusting apparatus is applied to a torsion beam type suspension including a torsion beam and so-called struts, for instance, shock absorbers, arranged separately from the vehicle height adjusting apparatus. In FIG. 1, reference numeral 3 denotes a trailing arm as a wheel assembly-side member, which is connected with the torsion beam. In this embodiment, the vehicle height adjusting apparatus is disposed on trailing arm 3. The vehicle height adjusting apparatus includes upper suspension coil spring 1U, lower suspension coil spring 1L, and actuator 2 operative for moving upper suspension coil spring 1U relative to lower suspension coil spring 1L in up-and-down direction 50 of a vehicle body extending substantially vertically relative to the vehicle body. Upper suspension coil spring 1U is connected to a vehicle body via upper support 22, and lower suspension coil spring 1L is connected to a wheel assembly via trailing arm 3. As shown in FIG. 1, upper and lower suspension coil springs 1U and 1L are different in diameter or winding diameter. Upper and lower suspension coil springs 1U and 1L are arranged in series in the axial direction.

Referring to FIG. 2, the vehicle height adjusting apparatus of the first embodiment is explained in detail. Upper suspension coil spring 1U has diameter D1, and lower suspension coil spring 1L has diameter D2 larger than diameter D1 of upper suspension coil spring 1U. Upper suspension coil spring 1U and lower suspension coil spring 1L are arranged in substantially coaxial relation to each other. At a position shown in FIG. 2, upper suspension coil spring 1U is located in a partially overlapping relation to lower suspension coil spring 1L in the axial direction. Lower suspension coil spring 1L has a lower end retained by lower spring seat 4 that is mounted onto trailing arm 3. Lower suspension coil spring 1L is thus connected to trailing arm 3 via lower spring seat 4. Lower suspension coil spring 1L has an upper end retained by upper spring seat 5. On the other hand, upper suspension coil spring 1U has an upper end retained by upper spring seat 6. Upper support 22 and bushing 23 are mounted to upper spring seat 6 via bearing 21 that is disposed on upper spring seat 6. Upper support 22 is mounted to a vehicle body-side member by means of bolts 24. Upper suspension coil spring 1U is driven by motor 10 of actuator 2 as explained later, so as to be rotatable about axis X thereof extending along up-and-down direction 50 of the vehicle body. Upper suspension coil spring 1U is, therefore, permitted by bearing 21 to rotate relative to the vehicle body-side member. Upper suspension coil spring 1U has a lower end retained by lower spring seat 7. Lower spring seat 7 for upper suspension coil spring 1U is smaller in outer diameter than upper spring seat 5 for lower suspension coil spring 1L. Specifically, upper spring seat 5 has a central opening for receiving lower spring seat 7 with a lower end portion of upper suspension coil spring 1U. Lower spring seat 7 with the lower end portion of upper suspension coil spring 1U is located inside the central opening of upper spring seat 5 so as to be moveable in the axial direction of upper suspension coil spring 1U.

Actuator 2 is substantially disposed within an inside space defined by upper suspension coil spring 1U and lower suspension coil spring 1L. Actuator 2 includes screw assembly 8, motor 10 for actuating screw assembly 8, and motor support 25 for supporting motor 10. At least a part of screw assembly 8 is disposed within the inside space. Screw assembly 8 is radially disposed between upper suspension coil spring 1U and lower suspension coil spring 1L, and connects upper suspension coil spring 1U and lower suspension coil spring 1L with each other. Specifically, screw assembly 8 is disposed between lower spring seat 7 for upper suspension coil spring 1U and upper spring seat 5 for lower suspension coil spring 1L. Screw assembly 8 is positioned between an outer circumferential periphery of lower spring seat 7 and an inner circumferential periphery of upper spring seat 5. Upper suspension coil spring 1U and lower suspension coil spring 1L are thus connected with each other via screw assembly 8. In this embodiment, screw assembly 8 is in the form of a ball-screw assembly. Screw assembly 8 includes threaded inner member 8I, threaded outer member 8O and a plurality of balls 8B rotatably disposed between threaded inner member 8I and threaded outer member 8O. Specifically, threaded inner member 8I and threaded outer member 8O are disposed coaxially and relatively rotatable to each other. Threaded inner member 8I has threaded or grooved outer circumferential surface, and threaded outer member 8O has threaded or grooved inner circumferential surface opposed to grooved outer circumferential surface of threaded inner member 8I. Balls 8B are rotatably retained between grooved outer and inner circumferential surfaces of threaded inner and outer members 8I and 8O. When threaded inner and outer members 8I and 8O are relatively rotated, balls 8B come into rolling contact with the grooved outer and inner circumferential surfaces of threaded inner and outer members 8I and 8O. The rolling movement of balls 8B allows threaded inner member 8I and threaded outer member 8O to relatively move in the axial direction. In this embodiment, threaded inner member 8I is mounted to lower spring seat 7 for upper suspension coil spring 1U, and threaded outer member 8O is mounted to upper spring seat 5 for lower suspension coil spring 1L. Stop 9 is arranged spaced upward from an upper end of threaded inner member 8I and limits an upward movement of threaded inner member 8I relative to threaded outer member 8O. Namely, stop 9 limits an upward movement of lower spring seat 7 for upper suspension coil spring 1U relative to upper spring seat 5 for lower suspension coil spring 1L, thereby preventing removal of upper suspension coil spring 1U from lower suspension coil spring 1L.

Motor 10 and motor support 25 are arranged within an inside space defined by lower suspension coil spring 1L. Motor 10 and motor support 25 may be disposed coaxially with lower suspension coil spring 1L. Motor support 25 is mounted onto lower spring seat 4 for lower suspension coil spring 1L. Motor 10 has rotating shaft 11 extending along the axial direction of lower suspension coil spring 1L. Rotating shaft 11 of motor 10 is connected with a lower surface of lower spring seat 7 for upper suspension coil spring 1U through reinforcing rib 26. Motor 10 has splined outer circumferential surface 28 meshed with splined inner circumferential surface 30 of motor support 25. Splined outer and inner circumferential surfaces 28 and 30 are so configured as to allow an axial movement of motor 10 relative to motor support 25. Accordingly, motor 10 is moveable relative to motor support 25 along the axial direction of lower suspension coil spring 1L.

The thus-constructed vehicle height adjusting apparatus operates in the following manner. When rotating shaft 11 of motor 10 is rotated in a clockwise or counterclockwise direction, lower spring seat 7 for upper suspension coil spring 1U and threaded inner member 8I of screw assembly 8 make a unitary rotation. This allows upper suspension coil spring 1U to move relative to lower suspension coil spring 1L in the axial direction thereof. FIG. 3 schematically illustrates the axial movement of upper suspension coil spring 1U relative to lower suspension coil spring 1L. As illustrated in FIG. 3, when upper suspension coil spring 1U is downwardly moved to retreat into the inside space of lower suspension coil spring 1L, the lower end of upper suspension coil spring 1U is displaced from an initial position indicated by a solid line, to a lower position indicated by lower broken line. In this state, upper suspension coil spring 1U overlaps in larger area with lower suspension coil spring 1L. In contrast, when upper suspension coil spring 1U is upwardly moved to remove from the inside space of lower suspension coil spring 1L, the upper end of upper suspension coil spring 1U is displaced from the initial position indicated by a solid line, to an upper position as indicated by upper broken line. In this state, upper suspension coil spring 1U overlaps in less area with lower suspension coil spring 1L.

As described above, actuator 2 is disposed within the inside space of lower suspension coil spring 1L, and especially, motor 10 and motor support 25 are arranged within the inside space of lower suspension coil spring 1L. Further, upper suspension coil spring 1U having smaller diameter D1 is axially overlapped with lower suspension coil spring 1L having larger diameter D2, and is movable inside lower suspension coil spring 1L in the axial direction thereof. With this arrangement, the vehicle height adjusting apparatus of this embodiment can achieve space-saving.

Further, in the vehicle height adjusting apparatus of this embodiment, screw assembly 8 disposed between upper suspension coil spring 1U and lower suspension coil spring 1L can ensure relative smooth movement of upper suspension coil spring 1U and lower suspension coil spring 1L. Further, in the vehicle height adjusting apparatus of this embodiment, the vehicle height can be adjusted by simply axially moving upper suspension coil spring 1U relative to lower suspension coil spring 1L. Further, when upper suspension coil spring 1U is axially moved relative to lower suspension coil spring 1L, a length of each of upper suspension coil spring 1U and lower suspension coil spring 1L which extends in the axial direction thereof is not substantially varied. Therefore, the vehicle height adjusting apparatus of this embodiment provides no change in suspension characteristic, and serves for keeping good comfort of the vehicle occupants. Further, the vehicle height adjusting apparatus of this embodiment is free from such a problem that high pressure is caused inside a shock absorber to thereby increase friction in the shock absorber as occurs in the related art. Furthermore, with the provision of stop 9, even if motor 10 fails to stop the rotation within a predetermined range in which the upward movement of threaded inner member 8I of screw assembly 8 is possible, threaded inner member 8I will come into abutment on stop 9 to thereby limit the upward movement of threaded inner member 8I. Therefore, threaded inner member 8I can be prevented from being disengaged from threaded outer member 8O.

Figure 4:
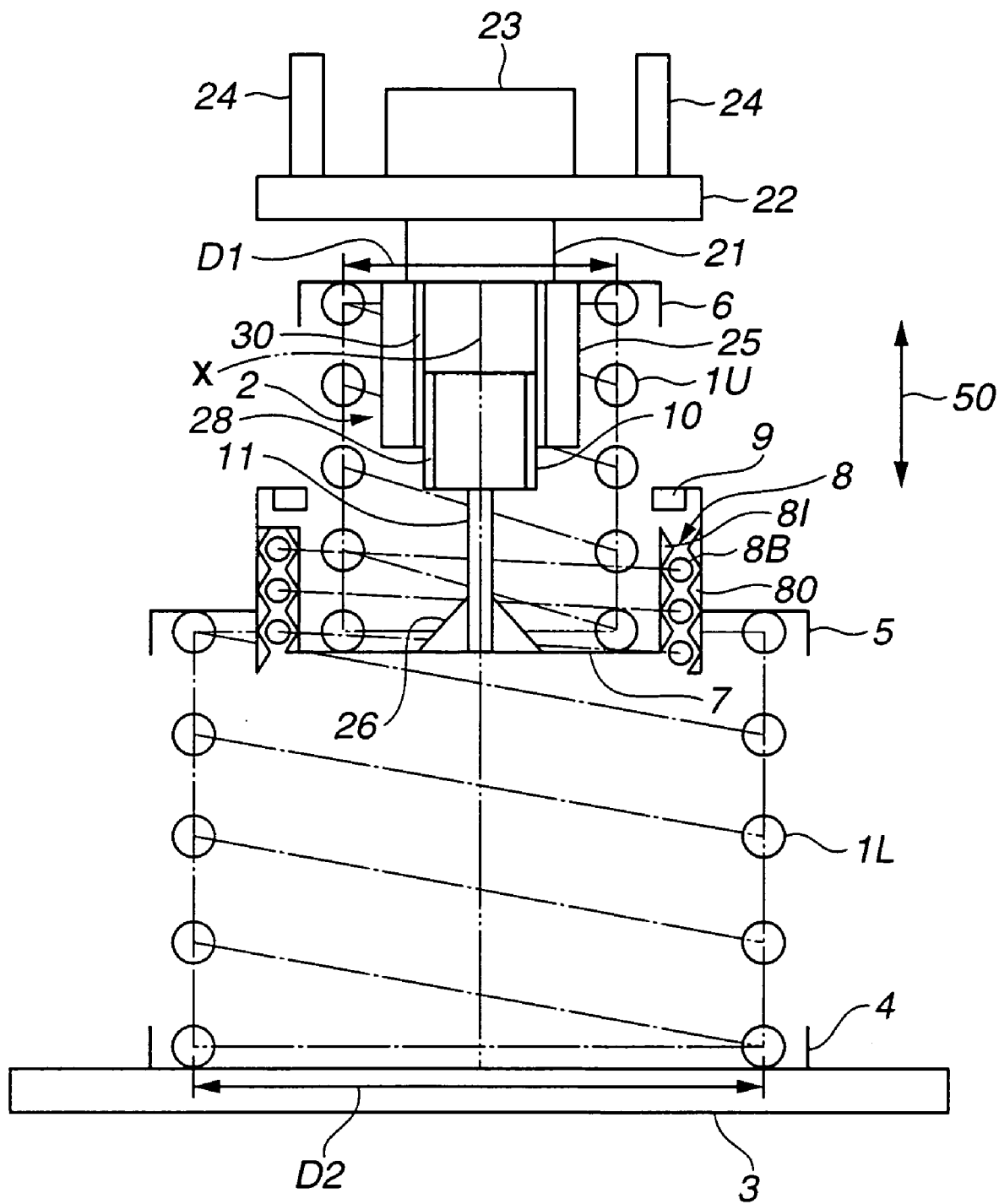
FIG. 4 is a diagram similar to FIG. 2, but illustrating the vehicle height adjusting apparatus according to a second embodiment of the present invention.

Referring to FIG. 4, a second embodiment of the vehicle height adjusting apparatus will be explained hereinafter. The second embodiment differs in arrangement of actuator 2 from the first embodiment. Like reference numerals denote like parts, and therefore, detailed explanations therefore are omitted. As illustrated in FIG. 4, motor 10 and motor support 25 of actuator 2 are disposed within an inside space of upper suspension coil spring 1U. Specifically, motor support 25 is mounted onto a lower surface of upper spring seat 6 for upper suspension coil spring 1U. Rotating shaft 11 of motor 10 is mounted onto an upper surface of lower spring seat 7 for upper suspension coil spring 1U through reinforcing rib 26. In this embodiment, motor 10 is controlled to rotate in a direction opposite to the direction in the first embodiment so that upper suspension coil spring 1U is movable relative to lower suspension coil spring 1L in the same axial direction as that in the first embodiment. The second embodiment can attain the same effects as described in the first embodiment.

The relationship in size between diameter D1 of upper suspension coil spring 1U and diameter D2 of lower suspension coil spring 1L is not limited to the first and second embodiments, and the relationship may be reversed. Namely, diameter D1 of upper suspension coil spring 1U may be larger than diameter D2 of lower suspension coil spring 1L. Further, the number of suspension coil springs arranged in series is not limited to two as described in the first and second embodiments. Three or more suspension coil springs may be used. Further, an actuator member for moving the suspension coil spring is not limited to motor 10 as described in the first and second embodiments, and may include various other actuator members or mechanisms. Furthermore, the vehicle height adjusting apparatus of the present invention is not limited to application to the torsion beam type suspension and may be applied to various types of vehicle suspensions.

This application is based on prior Japanese Patent Application No. 2003-145200 filed on May 22, 2003. The entire contents of the Japanese Patent Application No. 2003-145200 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An apparatus for adjusting vehicle height, the apparatus being disposed between a vehicle body and a wheel assembly, the apparatus comprising:

a first suspension coil spring adapted to be connected to the vehicle body;

a second suspension coil spring adapted to be connected to the wheel assembly, the second suspension coil spring being different in diameter from the first suspension coil spring and arranged in serial relation to the first suspension coil spring in an axial direction thereof; and an actuator substantially disposed within an inside space defined by the first and second suspension coil springs, the actuator being operative to axially move one of the first and second suspension coil springs relative to the other thereof, wherein the actuator is configured to rotate one of the first and second suspension coil springs relative to the other.

2. An apparatus for adjusting vehicle height, the apparatus being disposed between a vehicle body and a wheel assembly, the apparatus comprising:

a first suspension coil spring adapted to be connected to the vehicle body;

a second suspension coil spring adapted to be connected to the wheel assembly, the second suspension coil spring being different in diameter from the first suspension coil spring and arranged in serial relation to the first suspension coil spring in an axial direction thereof; and an actuator substantially disposed within an inside space defined by the first and second suspension coil springs, the actuator being operative to axially move one of the first and second suspension coil springs relative to the other thereof, wherein the actuator comprises a screw assembly disposed between the first and second suspension coil springs, and a motor disposed within the inside space defined by the first and second suspension coil springs which is operative to actuate the screw assembly.

3. The apparatus as claimed in claim 2, wherein the motor is disposed within an inside space defined by one of the first and second suspension coil springs.

4. The apparatus as claimed in claim 2, further comprising a first spring seat retaining the first suspension coil spring and a second spring seat retaining the second suspension coil spring, the first and second spring seats having different diameters, respectively, the screw assembly being disposed between the first and second spring seats.

5. The apparatus as claimed in claim 2, wherein the screw assembly is in the form of a ball-screw assembly.

6. The apparatus as claimed in claim 4, wherein the screw assembly comprises a threaded inner member mounted to the first spring seat, a threaded outer member mounted to the second spring seat, and a plurality of balls rotatably disposed between the threaded inner and outer members.

7. The apparatus as claimed in claim 2, wherein the actuator further comprises a motor support in which the motor is axially moveably supported.

8. The apparatus as claimed in claim 7, wherein the motor and the motor support have splined surfaces, respectively, the splined surfaces being meshed with each other.

* * * * *